Patented Mar. 26, 1940

2,195,382

UNITED STATES PATENT OFFICE 2,195,382

UNSATURATED FUROATE

Harold R. Slagh, Midland, Mich., assignor to The Dow Chemical Company, Midland, Mich., a corporation of Michigan No Drawing. Application October 12, 1937,
Serial No. 168,623

6 Claims. (Cl. 260—345)

The present invention relates to new unsaturated furoates having the general formula:

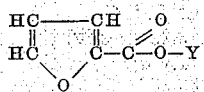

wherein Y represents a hydrocarbon radical containing at least one ethylenic linkage in an aliphatic chain. These new compounds are all colorless mobile liquids with moderatately high boiling points. They are useful as solvents for various materials and especially as modifying agents in the polymerization of vinyl compounds, particularly styrene.

The new esters may be prepared by reacting furoic acid with an alcohol containing at least one ethylenic linkage. The reaction is preferably carried out using approximately one mol of furoic acid, an excess, e. g. 1.1 to 5 mols, of the alcohol, and a small proportion, e. g. 0.01 to 0.1 mol, of a mineral acid as a catalyst, although other proportions may be used. The agents are mixed and heated at a moderate temperature, e. g. 40° to 150° C., for a period of from about 4 to 30 hours. Excess alcohol is then distilled from the mixture, after which the residue is neutralized and fractionally distilled at reduced pressure to separate the ester product.

In preparing unsaturated furoates by the method just described, I have found that the yield may be improved by adding to the esterification mixture a water-immiscible liquid which forms an azeotropic mixture with water. As the reaction proceeds, the azeotrope may be boiled off, thus removing the water formed during the esterification and allowing the reaction to proceed more nearly to completion. Methylene dichloride and chlorobenzene have been found particularly suitable for this purpose.

The new unsaturated esters may also be prepared by reacting a heavy metal salt, e. g. a lead and silver salt, of furoic acid with a hydrocarbon halide containing at least one ethylenic linkage. According to the preferred procedure, a mixture of one mol of the salt and an excess, e. g. 2 to 10 mols, of the halide is heated in a closed container for several hours at a temperature between about 100° and 200° C. The reaction mixture is then coiled, washed with water, and filtered, and the filtrate is fractionally distilled at reduced pressure to separate the ester product.

The following examples illustrate various ways in which the principle of the invention has been employed but are not to be construed as limiting the invention:

Example 1

A mixture of 112 grams of furoic acid, 84 grams of allyl alcohol, 5 grams of concentrated sulfuric acid, and 231 grams of methylene dichloride was heated for 22 hours at a temperature between about 45° C. and about 70° C. During this time, the methylene dichloride-water azeotrope distilled slowly from the mixture and was condensed, the water being separated and the methylene dichloride returned to the reaction. In all 15.5 grams of water was thus separated. When the reaction was complete, sodium carbonate was added to neutralize the mixture, and the latter was then fractionally distilled at reduced pressure, the fraction distilling at temperatures between 81° at 0.2 inch absolute pressure, and 82° at 0.15 inch being collected. This fraction consisted of 113 grams of allyl furoate, the formula of which is:

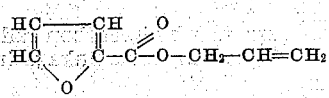

Allyl furoate is a colorless mobile liquid having a specific gravity of 1.118 at 25°/25° C. and a refractive index of 1.4945 at 20° C.

Example 2

A mixture of 112 grams of furoic acid, 186 grams of geraniol, 1 gram of concentrated sulfuric acid and 300 grams of chlorobenzene was heated for 22 hours at temperatures between 147° and 154° C. During heating, the chlorobenzene-water azeotrope distilled slowly from the mixture and was condensed, the water being separated and the chlorobenzene returned continuously to the reaction. In all 18 grams of water was thus removed. When the reaction was complete, sodium carbonate was added to neutralize the mixture and the latter was fractionally distilled at reduced pressure, the fraction distilling at temperatures between 148° and 155° at 0.2 inch absolute pressure being collected. This fraction consisted of 89 grams of geranyl furoate, a slightly yellowish sweet-smelling liquid having a specific gravity of 0.975 at 25°/25° C., and having the formula:

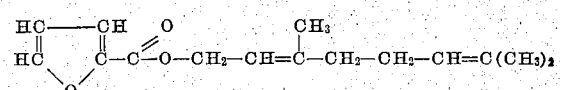

Example 3

A mixture of 81 grams of lead furoate and 135.7 grams of methallyl chloride was heated in a closed container for 4 hours at a temperature of about 160° C. The reaction mixture was then cooled, washed with water, and filtered. The filtrate was fractionally distilled at reduced pressure, the fraction distilling at temperatures between 82° and 84° C. at 0.1 inch absolute pressure being collected. This fraction consists of 11 grams of methallyl furoate, which has the formula:

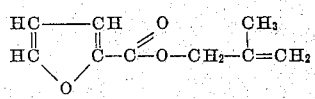

The product is a colorless mobile liquid having a specific gravity of 1.086 at 25°/25° C. and a refractive index of 1.4922 at 20° C.

Other furoates having the general formula hereinbefore presented may also be prepared by the methods illustrated in the foregoing detailed examples, e. g. crotyl furoate, (penten-1-yl-5) furoate, (octen-2-yl-8) furoate, citronellyl furoate, cinnamyl furoate, etc. Such compounds are usually colorless mobile liquids and are useful as modifying agents in the polymerization of vinyl compounds.

Other modes of applying the principle of the invention may be employed, change being made as regards the details hereinbefore disclosed, provided the product stated by any of the following claims or the equivalent of such stated product be employed.

I therefore particularly point out and distinctly claim as my invention:

1. An unsaturated furoate having the general formula:

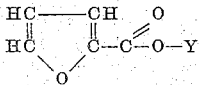

wherein Y represents a hydrocarbon radical containing at least one ethylenic linkage in an aliphatic chain.

2. An unsaturated furoate having the general formula:

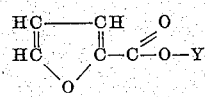

wherein R is an aliphatic radical containing at least one ethylenic linkage.

3. Allyl furoate, a colorless mobile liquid having a boiling point of about 81° at 0.2 inch absolute pressure, a specific gravity of about 1.118 at 25°/25° C., and a refractive index of about 1.4945 at 20° C.

4. Methallyl furoate, a colorless mobile liquid having a boiling point of about 82° to 84° C. at 0.1 inch absolute pressure, a specific gravity of about 1.086 at 25°/25° C. and a refractive index of about 1.4922 at 20° C.

5. Geranyl furoate, a slightly yellowish sweet-smelling liquid, having a boiling point of about 148° to 153° C. at 0.2 inch absolute pressure, and a specific gravity of about 0.975 at 25°/25° C.

6. An unsaturated furoate having the general formula

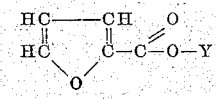

wherein Y is a radical selected from the class consisting of allyl, methallyl, crotyl, penten-1-yl-5, octen-2-yl-8, geranyl, citronellyl, and cinnamyl radicals.

HAROLD R. SLAGH.